(12) United States Patent
Kuang

(10) Patent No.: US 11,129,093 B2
(45) Date of Patent: Sep. 21, 2021

(54) RESIDUAL ACCESS POINT INFORMATION RECOGNITION METHOD AND RECOGNITION APPARATUS

(71) Applicant: HONOR DEVICE CO., LTD., Shenzhen (CN)

(72) Inventor: Yunsheng Kuang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 19 days.

(21) Appl. No.: 16/651,142

(22) PCT Filed: Oct. 12, 2017

(86) PCT No.: PCT/CN2017/105883
§ 371 (c)(1),
(2) Date: Mar. 26, 2020

(87) PCT Pub. No.: WO2019/061557
PCT Pub. Date: Apr. 4, 2019

(65) Prior Publication Data
US 2020/0275353 A1 Aug. 27, 2020

(30) Foreign Application Priority Data
Sep. 29, 2017 (CN) .......................... 201710911578.6

(51) Int. Cl.
*H04Q 7/00* (2006.01)
*H04W 48/16* (2009.01)
(Continued)

(52) U.S. Cl.
CPC ......... *H04W 48/16* (2013.01); *H04W 64/003* (2013.01); *H04W 80/02* (2013.01)

(58) Field of Classification Search
CPC ..... H04W 28/22; H04W 28/24; H04W 24/00; H04W 24/08; H04W 28/08; H04W 84/00; H04W 88/02; H04W 99/00
(Continued)

(56) References Cited

U.S. PATENT DOCUMENTS 9,392,407 B2 * 7/2016 Brachet ................. H04W 48/20
2006/0039280 A1 * 2/2006 Anandakumar ......... H04B 7/06
370/229

(Continued)

FOREIGN PATENT DOCUMENTS

CN  101076191 A  11/2007
CN  101686164 A  3/2010
(Continued)

OTHER PUBLICATIONS

IEEE Std 802.11n™—2009 Part 11: Wireless LAN Medium Access Control (MAC) and Physical Layer (PHY) Specifications Amendment 5: Enhancements for HigherThroughput,IEEE Computer Society,total 536 pages.
(Continued)

Primary Examiner — Joseph Arevalo
(74) Attorney, Agent, or Firm — Hauptman Ham, LLP

(57) ABSTRACT

A method includes obtaining first movement information of a to-be-located device. The method also includes obtaining a target time threshold based on the first movement information. The method further includes obtaining a first scan timestamp corresponding to a target time and a first media access control MAC address, where the target time is a fingerprint collection time of a first fingerprint or a maximum value of a scan timestamp corresponding to at least one MAC address included in the first fingerprint. The first MAC address is included in the first fingerprint. The method additionally includes, if a difference between the target time
(Continued)

and the first scan timestamp is greater than the target time threshold, determining that access point information corresponding to the first MAC address is residual access point information.

10 Claims, 7 Drawing Sheets

(51) Int. Cl.
*H04W 64/00* (2009.01)
*H04W 80/02* (2009.01)

(58) Field of Classification Search
USPC .............................. 370/352, 229, 395.21, 252
See application file for complete search history.

(56) References Cited

U.S. PATENT DOCUMENTS

| | | | |
|---|---|---|---|
| 2011/0280137 A1* | 11/2011 | Bockwoldt | H04L 43/50 370/252 |
| 2013/0300633 A1* | 11/2013 | Horio | G06F 3/1454 345/2.2 |
| 2016/0182514 A1 | 6/2016 | Golaup et al. | |
| 2016/0183089 A1 | 6/2016 | Pudney et al. | |
| 2016/0227367 A1 | 8/2016 | Alsehly et al. | |
| 2016/0381068 A1* | 12/2016 | Galula | H04L 63/123 726/23 |
| 2017/0013005 A1* | 1/2017 | Galula | H04L 63/20 |
| 2019/0327124 A1* | 10/2019 | Lai | H04L 27/362 |
| 2020/0202117 A1* | 6/2020 | Wu | H04W 4/029 |
| 2020/0271747 A1* | 8/2020 | Wu | G01P 15/18 |

FOREIGN PATENT DOCUMENTS

| | | |
|---|---|---|
| CN | 103747519 A | 4/2014 |
| CN | 104359480 A | 2/2015 |
| CN | 104427108 A | 3/2015 |
| CN | 104581875 A | 4/2015 |
| CN | 105491642 A | 4/2016 |
| CN | 106792549 A | 5/2017 |
| CN | 106961434 A | 7/2017 |
| CN | 107172686 A | 9/2017 |
| CN | 105338498 B | 11/2018 |
| EP | 2976903 A2 | 1/2016 |
| EP | 3198226 B1 | 1/2020 |

OTHER PUBLICATIONS

IEEE Std 802.11a—1999 Part 11: Wireless LAN Medium Access Control (MAC) and Physical Layer (PHY) specifications: High-speed Physical Layer in the 5 GHZ Band,IEEE Computer Society,total 91 pages.
IEEE Std 802.11g™—2003 Part 11: Wireless LAN Medium Access Control (MAC) and Physical Layer (PHY) specifications Amendment 4: Further Higher Data Rate Extension in the 24 GHz Band,IEEE Computer Society,total 78 pages.
IEEE Std 802.11b—1999/Cor 1-2001 Part 11: Wireless LAN Medium Access Control (MAC) and Physical Layer (PHY) specificationsAmendment 2: Higher-speed Physical Layer (PHY)extension in the 24 GHz band—Corrigendum 1,IEEE Computer Society,total 24 pages.
IEEE Std 802.11b—1999 (R2003) Part 11: Wireless LAN Medium Access Control(MAC) and Physical Layer (PHY) specifications:Higher-Speed Physical Layer Extension in the 2.4 GHz Band,IEEE Computer Society,total 96 pages.
Extended European Search Report issued in corresponding European Patent Application No. 17926584.8, dated Sep. 25, 2020, Munich, Germany.
International search report dated Jun. 20, 2018 from corresponding application No. PCT/CN2017/105883.

* cited by examiner

RESIDUAL ACCESS POINT INFORMATION RECOGNITION METHOD AND RECOGNITION APPARATUS

CROSS-REFERENCE TO RELATED APPLICATIONS

This application is a National Stage of International Application No. PCT/CN2017/105883, filed on Oct. 12, 2017, which claims priority to Chinese Patent Application No. 201710911578.6, filed on Sep. 29, 2017.

TECHNICAL FIELD

The present invention relates to the field of terminal technologies, and in particular, to a residual access point information recognition method and a recognition apparatus.

BACKGROUND

Currently, it is a common practice in the industry to build a location database based on crowd-sourcing (crowd-sourcing) to provide a wireless location service to users. Building a location database based on crowd-sourcing means updating the location database in real time based on location information reported by a large quantity of users per day and wireless fidelity (wireless fidelity, Wi-Fi). When using a location service application (for example, a map), a user does not need to enable the global positioning system (global positioning system, GPS). Instead, only by using nearby Wi-Fi information discovered by scanning, and based on location information and Wi-Fi information in the location database, a current location of the user can be determined, and a location service such as navigation or location pushing can be performed.

Regardless of various forms of crowd-sourcing fingerprints, data content of the crowd-sourcing fingerprints includes nothing more than two aspects of information: location information and Wi-Fi signal information. The location information includes information about a location of a crowd-sourcing data collection point. For example, the location information includes latitude/longitude coordinates, positional accuracy ACC (accuracy), a speed, and an azimuth angle. The Wi-Fi signal information includes information about a surrounding Wi-Fi access point (access point, AP) discovered by scanning at the location of the crowd-sourcing data collection point. One piece of Wi-Fi signal information includes AP information broadcast by one or more surrounding APs discovered by scanning. The AP information includes a media access control (media access control, MAC) address, a received signal strength indicator (received signal strength indicator, RSSI), a scan timestamp, and the like.

The location information and the Wi-Fi signal information are collected separately by two completely independent modules, and therefore they are not synchronous in terms of collection time. A process of collecting one piece of crowd-sourcing data is shown in FIG. 1.

As shown in FIG. 1, update of location information and update of Wi-Fi signal information are two independent threads, while collection of crowd-sourcing data is triggered by update of the location information. Duration of one Wi-Fi signal scan is related to a physical layer protocol supported by a Wi-Fi chip. For example, for a single-band device whose Wi-Fi chip supports only a protocol operating on a 2.4 GHz frequency band, such as the institute of electrical and electronics engineers (institute of electrical and electronics engineers, IEEE) 802.11 b/g, duration of one scan is approximately 1.5 seconds; while for a dual-band device whose Wi-Fi chip further supports a protocol operating on a 5 GHz frequency band, such as IEEE 802.11 a/n, duration of one scan is approximately 2.5 s to 3 s. After scanning is completed, the Wi-Fi chip generates a broadcast (broadcast) packet and report the broadcast packet to an upper layer. The broadcast packet carries Wi-Fi signal information. The broadcast packet is stored in a cache area, and a cache is updated when a new broadcast packet is generated by a next scan. In this way, when the location information is updated, a crowd-sourcing data collection module reads broadcast packet information in the cache area in real time, to obtain the Wi-Fi signal information. Based on the Wi-Fi signal information, a fingerprint of the crowd-sourcing data is obtained. In other words, one broadcast packet corresponds to one fingerprint, and one fingerprint includes one or more pieces of access point information.

As shown in FIG. 1, at a location update time point 1, an obtained Wi-Fi scan broadcast packet is a broadcast packet 1, and a crowd-sourcing fingerprint obtained at this moment is location information 1 and the broadcast packet 1; at a location update time point 2, an obtained Wi-Fi scan broadcast packet is a broadcast packet 2, and a crowd-sourcing fingerprint obtained at this moment is location information 2 and the broadcast packet 2; and at a location update time point 3, an obtained Wi-Fi scan broadcast packet is a broadcast packet 3, and a crowd-sourcing fingerprint obtained at this moment is location information 3 and the broadcast packet 3.

It is found in an analysis process of crowd-sourcing data that access point information discovered by one Wi-Fi scan and access point information included in a generated broadcast packet are not always the same. Access point information that is not discovered in a current Wi-Fi scan but is included in a broadcast packet generated after the current Wi-Fi scan is referred to as residual access point information.

A reason why residual access point information is generated is related to a Wi-Fi scanning mechanism. For example, during Wi-Fi scanning, only when terminal devices in some systems do not discover a MAC address after performing three consecutive scans, the MAC address and information about the MAC address are removed from a broadcast packet. Otherwise, the MAC address and the information about the MAC address are reserved in the broadcast packet, forming residual access point information. Therefore, for mobile phones of some brands currently sold on the market, residual access point information is inevitably generated during crowd-sourcing data collection.

Residual access point information is equivalent to information about an access point that is obtained through "virtualization" at a location, destroying a real correspondence between location information and Wi-Fi signal information in crowd-sourcing data. If positioning is performed based on the residual access point information, a positioning result is inevitably adversely affected, reducing positioning accuracy. Therefore, a residual access point needs to be recognized and filtered out.

SUMMARY

Embodiments of the present invention disclose a residual access point information recognition method and a recognition apparatus, to accurately recognize residual access point information, and further filter out the residual access point information, thereby improving positioning accuracy.

According to a first aspect, an embodiment of this application provides a residual access point information recognition method, where the method includes: obtaining first movement information of a to-be-located device, where the first movement information is a movement status or a movement speed of the to-be-located device; obtaining a target time threshold based on the first movement information; obtaining a first scan timestamp corresponding to a target time and a first media access control MAC address, where the target time is a fingerprint collection time of a first fingerprint or a maximum value of a scan timestamp corresponding to at least one MAC address included in the first fingerprint, and the first MAC address is a MAC address in the first fingerprint; and if a difference between the target time and the first scan timestamp is greater than the target time threshold, determining that access point information corresponding to the first MAC address is residual access point information.

It is found in practice that, residual access point information is access point information discovered by previous several scans, and therefore a scan timestamp of the residual access point information is significantly smaller compared with a scan timestamp of access point information discovered by a current scan. Therefore, if a difference between the first scan timestamp corresponding to the first MAC address in the first fingerprint and the target time is relatively large, the access point information corresponding to the first MAC address is residual access point information.

Optionally, the first movement information is a movement status, and the obtaining a target time threshold based on the first movement information includes: obtaining, based on a preset correspondence between a movement status and a threshold, a threshold corresponding to the first movement information as the target time threshold, where in the correspondence, a first movement status corresponds to a first threshold, and a second movement status corresponds to a second threshold; a movement speed corresponding to the first movement status is lower than a movement speed corresponding to the second movement status; and the first threshold is greater than or equal to the second threshold.

Optionally, the first movement information is a movement speed, and the obtaining a target time threshold based on the first movement information includes: obtaining, based on a preset correspondence between a speed interval and a threshold, a threshold corresponding to a speed interval corresponding to the first movement information as the target time threshold, where in the correspondence, a first speed interval corresponds to a first threshold, and a second speed interval corresponds to a second threshold; all speeds in the first speed interval are lower than speeds in the second speed interval; and the first threshold is greater than or equal to the second threshold.

In this implementation, threshold setting should be associated with the movement speed of the to-be-located device, without simply setting a same threshold. If the movement status of the to-be-located device is a low-speed state such as still or walking, a residual AP has less influence on positioning accuracy. On the contrary, if more residual APs are reserved, a larger quantity of MAC addresses are used for positioning calculation, improving positioning accuracy. Therefore, in this case, a threshold may be relaxed. If the movement status of the to-be-located device is a high-speed movement state such as driving, within a same time, a distance at which a to-be-located object moves is longer, and a residual AP has a relatively large influence on positioning accuracy, and therefore a threshold should be reduced.

Optionally, after it is determined that the access point information corresponding to the first MAC address is residual access point information, the access point information corresponding to the first MAC address may further be deleted from the first fingerprint.

According to a second aspect, an embodiment of this application provides a residual access point information recognition method, where the method includes: obtaining a first media access control MAC address from a first fingerprint; searching a fingerprint received before the first fingerprint for a scan timestamp corresponding to the first MAC address; determining a scan timestamp that corresponds to the first MAC address and that is found for the first time, as a second scan timestamp; and if a difference between a first scan timestamp corresponding to the first MAC address in the first fingerprint and the second scan timestamp is less than or equal to a preset value, determining that access point information corresponding to the first MAC address in the first fingerprint is residual access point information.

By implementing the method described in the first aspect, residual access point information included in a fingerprint can be accurately recognized.

Optionally, a specific implementation of the searching a fingerprint received before the first fingerprint for a scan timestamp corresponding to the first MAC address may be: searching, in a reverse order of reception of fingerprint information N fingerprints received before the first fingerprint, for the scan timestamp corresponding to the first MAC address, where N is greater than 0, and the N fingerprints are stored in a first-in first-out queue.

This implementation may be applied to a scenario in which a server performs real-time positioning. In this implementation, the server can store, in the first-in first-out queue, a fingerprint received before the first fingerprint. This helps the server to search, in a reverse order of reception of fingerprints the fingerprint received before the first fingerprint, for the scan timestamp corresponding to the first MAC address.

Optionally, after it is determined that the access point information corresponding to the first MAC address is residual access point information, the residual access point information included in the first fingerprint is deleted when the first fingerprint is deleted from the first-in first-out queue.

If the residual access point information in the first fingerprint is deleted from the first-in first-out queue, residual access point information in a fingerprint received after the first fingerprint may not be accurately recognized. Therefore, the residual access point information included in the first fingerprint is deleted only when the first fingerprint is deleted from the first-in first-out queue. This is conducive to improvement of accuracy of recognizing residual access point information in a subsequent fingerprint.

Optionally, M fingerprints may be further received, where the first fingerprint is one of the M fingerprints and is not an earliest received fingerprint among the M fingerprints, and M is greater than 1; a standard fingerprint list is generated based on all MAC addresses in the M fingerprints and scan timestamps corresponding to the MAC addresses, where in the standard fingerprint list, one row corresponds to one fingerprint, and one column includes a scan timestamp corresponding to one MAC address; and correspondingly, a specific implementation of the searching a fingerprint received before the first fingerprint for a scan timestamp corresponding to the first MAC address may be: searching, in a reverse order of reception of fingerprints the standard fingerprint list, for the scan timestamp that corresponds to the first MAC address and that is received before the first fingerprint.

This implementation may be applied to a scenario in which the server does not need to perform real-time positioning. By generating the standard fingerprint list, the second scan timestamp corresponding to the first MAC address can be searched for more conveniently and faster.

Optionally, if no scan timestamp corresponding to the first MAC address is found in the fingerprint received before the first fingerprint, it is determined that the access point information corresponding to the first MAC address in the first fingerprint is non-residual access point information.

According to a third aspect, a recognition apparatus is provided, where the recognition apparatus can perform the method in the first aspect, the second aspect, the possible implementations of the first aspect, or the possible implementations of the second aspect. This function may be implemented using hardware, or implemented using corresponding software executed by hardware. The hardware or software includes one or more modules corresponding to the foregoing functions. The units can be software and/or hardware. Based on a same inventive concept, for a problem-solving principle and beneficial effects of the recognition apparatus, refer to the first aspect, the second aspect, the possible implementations of the first aspect, or the possible implementations of the second aspect and the beneficial effects, and repeated content is not described herein again.

According to a fourth aspect, a recognition apparatus is provided, where the recognition apparatus includes a processor, a memory, a communications interface, and one or more programs, where the processor, the communications interface, and the memory are connected, the one or more programs are stored in the memory, and the processor is configured to call the program stored in the memory to implement the solution in the first aspect, the second aspect, the possible implementations of the first aspect, or the possible implementations of the second aspect. For a problem-solving implementation and beneficial effects of the recognition apparatus, refer to the first aspect, the second aspect, the possible implementations of the first aspect, or the possible implementations of the second aspect and the beneficial effects, repeated content is not described herein again.

According to a fifth aspect, a computer program product is provided, where when the computer program product runs on a computer, the computer is enabled to perform the method in either the first aspect or the second aspect, any optional implementation of the first aspect, or any optional implementation of the second aspect.

According to a sixth aspect, a chip product of a recognition apparatus is provided, to perform the method in either the first aspect or the second aspect, any optional implementation of the first aspect, or any optional implementation of the second aspect.

BRIEF DESCRIPTION OF DRAWINGS

To describe the technical solutions in embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

To make the objectives, technical solutions, and advantages of the present invention clearer, the following describes the technical solutions of the embodiments of the present invention with reference to the accompanying drawings.

The embodiments of this application provide a residual access point information recognition method and a recognition apparatus, to accurately recognize residual access point information, and further filter out the residual access point information, thereby improving positioning accuracy.

To better understand the embodiments of this application, a communications system to which the embodiments of this application can be applied is described below.

Figure 1:
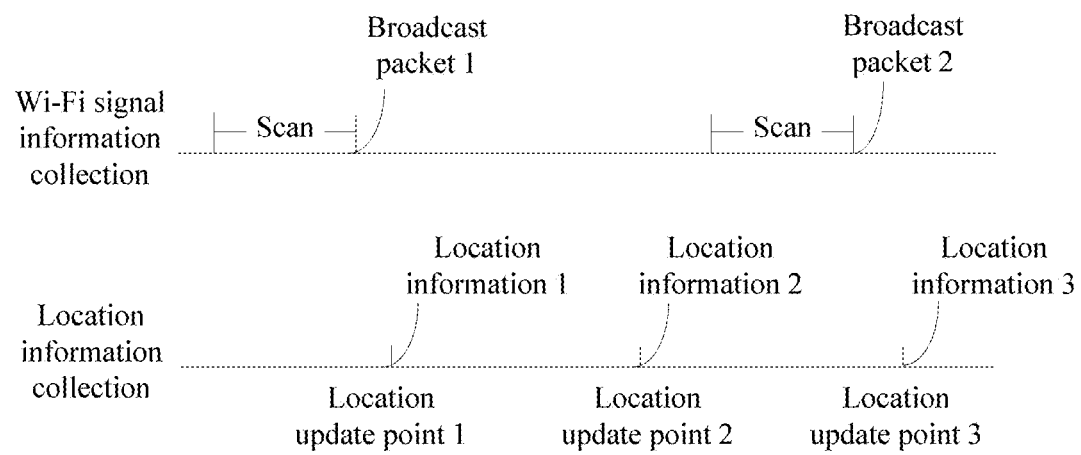
FIG. 1 is a schematic diagram of a prior-art fingerprint reporting manner.
Figure 2:
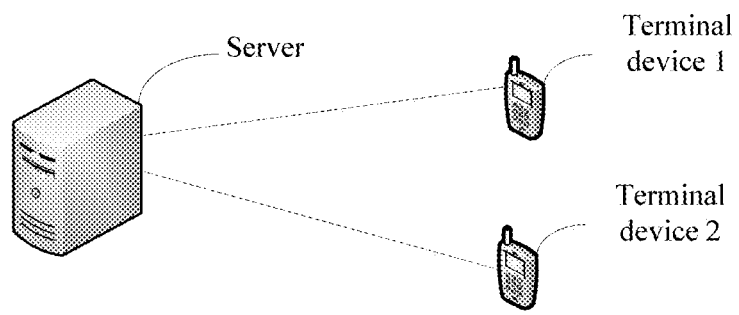
FIG. 2 is a schematic structural diagram of a communications system according to an embodiment of the present invention.

FIG. 2 is a schematic diagram of a communications system according to an embodiment of this application. As shown in FIG. 2, the communications system includes a server and a terminal device. In FIG. 2, that the communications system includes two terminal devices is used as an example. Certainly, the communications system may alternatively include more than two terminal devices, and this is not limited in this embodiment.

The terminal device may be an access terminal, user equipment (user equipment, UE), a subscriber unit, a subscriber station, a mobile station, a mobile console, a remote station, a remote terminal, a mobile terminal, a user terminal, a terminal, a wireless communications device, a user agent, or a user apparatus. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device, a vehicle-mounted device, a wearable device, a terminal device in the Internet of Things, a terminal device in a future 5G network, a terminal device in a public land mobile network (public land mobile network, PLMN) evolved in the future, or the like.

The terminal device may scan Wi-Fi signal information, and one piece of Wi-Fi signal information corresponds to one fingerprint, and the one fingerprint includes access point information broadcast by one or more surrounding access points discovered by scanning. The access point information includes a MAC address and a scan timestamp, and the access point information may further include an RSSI and the like. The scan timestamp refers to a time from a startup moment of the terminal device to a moment at which the MAC address is discovered by scanning, and is in a unit of millisecond ms. For example, if the startup moment is 1000 ms and the moment at which the MAC address is discovered by scanning is 1500 ms, the scan timestamp is 500 ms. Specifically, when the terminal device is started successfully, the terminal device may enable a timer for timekeeping, and when detecting that the terminal device has scanned the MAC address, determine a time counted by the timer as a scan timestamp corresponding to the MAC address.

The server may be a server corresponding to a location application. Conventional fingerprint positioning technologies are divided into two phases: an offline training phase and an online positioning phase. In the offline training phase, the server may receive fingerprints, including access point information and location information, reported by a plurality of terminal devices, and store fingerprint information in a location database. In the online positioning phase, the server compares a fingerprint, including access point information, received by a to-be-located device with a fingerprint in the location database to obtain location information of the to-be-located device.

During actual application, in the online positioning phase, a fingerprint that is sent by the to-be-located device and that is received by the server may include residual access point information. Access point information that is not discovered in a current Wi-Fi scan but is included in a fingerprint generated after the current Wi-Fi scan is referred to as residual access point information. The server performs positioning on the to-be-located device based on received residual access point information and the fingerprint in the location database, and positioning accuracy is inevitably reduced. A fingerprint received by the server in the offline training phase may also include residual access point information. If the residual access point information is introduced into the location database, a positioning result is inevitably adversely affected, reducing positioning accuracy. Therefore, this application provides a residual access point information recognition method and a recognition apparatus to recognize residual access point information.

The residual access point information recognition method and the recognition apparatus provided in this application are further described below.

Figure 3:
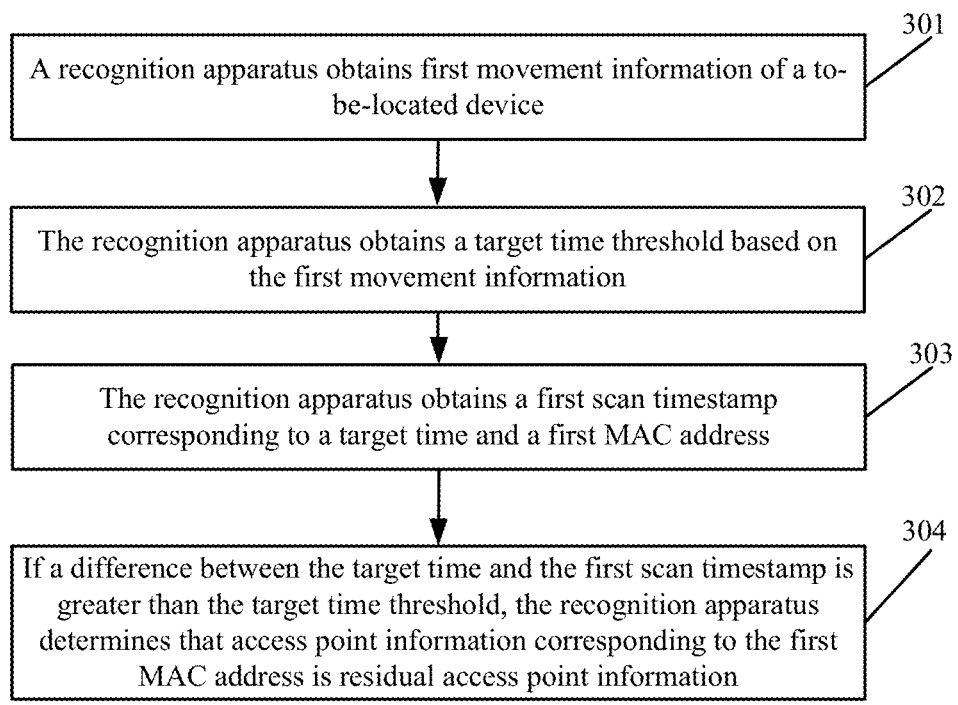
FIG. 3 is a schematic flowchart of a residual access point information recognition method according to an embodiment of the present invention.

FIG. 3 shows a residual access point information recognition method according to an embodiment of this application. As shown in FIG. 3, the residual access point information recognition method includes the following section 301 and section 302.

301. A recognition apparatus obtains first movement information of a to-be-located device.

The first movement information is a movement status or a movement speed of the to-be-located device.

The recognition apparatus may be a server or a to-be-located device. When the recognition apparatus is a to-be-located device, the to-be-located device recognizes residual access point information, and then reports access point information other than the residual access point information to the server.

The first movement information may be calculated and output by a device such as a sensor of the to-be-located device. The movement status of the to-be-located device may be indicated by AR (Activity Recognition, activity recognition) status information of a device installed in the to-be-located device, and AR states may include: still (still), walking (walking), in vehicle (in vehicle), on bicycle (on bicycle), running (running), on foot (on foot), tilting (tilting), and unknown (unknown). Different movement statuses correspond to different speed intervals. For example, a movement speed lower than 0.8 m/s corresponds to "still", a movement speed of 0.8-2 m/s corresponds to "walking", a movement speed of 2-8 m/s to "on bicycle", and a movement speed of 8-30 m/s corresponds to "in vehicle". The movement speed may be obtained by a terminal device by using a GPS packet, and packet information output by a GPS chip carries speed information in a unit of m/s.

302. The recognition apparatus obtains a target time threshold based on the first movement information.

For example, if the first movement information indicates a still state, the target time threshold may be 10 s; and if the first movement information indicates an in vehicle state, the target time threshold may be 2.5 s.

303. The recognition apparatus obtains a first scan timestamp corresponding to a target time and a first MAC address.

The target time is a fingerprint collection time of a first fingerprint or a maximum value of a scan timestamp corresponding to at least one MAC address included in the first fingerprint. The first MAC address is a MAC address in the first fingerprint. If the recognition apparatus is a to-be-located device, the first fingerprint may be a fingerprint currently discovered by scanning by the to-be-located device. If the recognition apparatus is a server, the first fingerprint may be a currently received fingerprint. For example, the first fingerprint includes access point information 1 to 3, the access point information 1 includes a MAC address 1 and a scan timestamp 1, the access point information 2 includes a MAC address 2 and a scan timestamp 2, and the access point information 3 includes a MAC address 3 and a scan timestamp 3. The first MAC address may be the MAC address 1, the MAC address 2, or the MAC address 3. A scan timestamp corresponding to the MAC address 1 is the scan timestamp 1, and access point information corresponding to the MAC address 1 is the access point information 1. The same is true for the MAC address 2 and the MAC address 3.

The fingerprint collection time of the first fingerprint refers to a time from a startup moment to a moment at which scan of the first fingerprint is completed. A maximum scan timestamp in the first fingerprint is closest to the fingerprint collection time. Therefore, if the server cannot obtain the fingerprint collection time, the server may obtain the maximum scan timestamp in the first fingerprint instead, and determine, based on a difference between the maximum scan timestamp in the first fingerprint and the first scan timestamp, whether access point information corresponding to the first MAC address is residual access point information.

304. If a difference between the target time and the first scan timestamp is greater than the target time threshold, the recognition apparatus determines that access point information corresponding to the first MAC address is residual access point information.

It is found in practice that, residual access point information is access point information discovered by previous several scans, and therefore a scan timestamp of the residual access point information is significantly smaller compared with a scan timestamp of access point information discovered by a current scan. Therefore, if a difference between the first scan timestamp corresponding to the first MAC address in the first fingerprint and the target time is relatively large, the access point information corresponding to the first MAC address is residual access point information.

For example, the first fingerprint includes access point information 1 to 3. The access point information 1 includes a MAC address 70:fe:a0:b1:f3:c2 and a scan timestamp 143786400, the access point information 2 includes a MAC address 90:c1:bb:e2:c1:d0 and a scan timestamp 143794210, and the access point information 3 includes a MAC address 90:c1:bb:e2:d3:d2 and a scan timestamp 143794210. The target time is the maximum scan timestamp 143794210 in the first fingerprint. The server obtains the MAC address 70:fe:a0:b1:f3:c2 included in the access point information 1 as the first MAC address, and calculates a difference between the scan timestamp 143786400 and the scan timestamp 143794210. If the difference between the scan timestamp 143786400 and the scan timestamp 143794210 is greater than a preset value, the access point information 1 is residual access point information. After recognizing whether the access point information 1 is residual access point information, the server obtains the MAC address 90:c1:bb:e2:c1:d0 included in the access point information 2 as the first MAC address, and calculates a difference between the scan timestamp 143794210 and the scan timestamp 143794210. If the difference between the scan timestamp 143794210 and the scan timestamp 143794210 is less than the preset value, the access point information 2 is non-residual access point information. After recognizing whether the access point information 2 is residual access point information, the server obtains the MAC address 90:c1:bb:e2:d3:d2 included in the access point information 3 as the first MAC address, and calculates a difference between the scan timestamp 143794210 and the scan timestamp 143794210. If the difference between the scan timestamp 143794210 and the scan timestamp 143794210 is less than the preset value, the access point information 3 is non-residual access point information.

The same is true when the target time is the fingerprint collection time of the first fingerprint, and details are not described herein.

Optionally, after it is determined that the access point information corresponding to the first MAC address is residual access point information, the access point information corresponding to the first MAC address may be deleted from the first fingerprint.

Optionally, if the recognition apparatus is a to-be-located device, after the residual access point information is recognized, the to-be-located device sends a fingerprint in which the residual access point information has been deleted to the server, so that the server can perform accurate positioning based on the fingerprint in which the residual access point information has been deleted.

Optionally, if the recognition apparatus is a server, after the residual access point information is recognized, the server can perform accurate positioning on the to-be-located device based on the fingerprint in which the residual access point information has been deleted.

It can be learned that the residual access point information can be accurately recognized by implementing the method described in FIG. 3.

Optionally, if the first movement information is a movement status, a specific implementation of the obtaining a target time threshold based on the first movement information may be: obtaining, based on a preset correspondence between a movement status and a threshold, a threshold corresponding to the first movement information as the target time threshold, where in the correspondence, a first movement status corresponds to a first threshold, and a second movement status corresponds to a second threshold; a movement speed corresponding to the first movement status is lower than a movement speed corresponding to the second movement status; and the first threshold is greater than or equal to the second threshold.

A general principle is that a lower movement speed corresponds to a larger threshold that is set. For example, for a "still" state, a threshold may be set to 10 s; for a "walking" state, a threshold may be set to 5.5 s; and for "on bicycle" and "in vehicle" states, a threshold may be set to 2.5 s.

Optionally, if the first movement information is a movement speed, a specific implementation of the obtaining a target time threshold based on the first movement information may be: obtaining, based on a preset correspondence between a speed interval and a threshold, a threshold corresponding to a speed interval corresponding to the first movement information as the target time threshold, where in the correspondence, a first speed interval corresponds to a first threshold, and a second speed interval corresponds to a second threshold; all speeds in the first speed interval are lower than speeds in the second speed interval; and the first threshold is greater than or equal to the second threshold.

A general principle is that a lower movement speed corresponds to a larger threshold that is set. For example, for a speed interval of less than 0.8 m/s, a threshold may be set to 10 s; for a speed interval of 0.8-2 m/s, a threshold may be set to 5.5 s; and for a speed interval of 2-30 m/s, a threshold may be set to 2.5 s. If the first movement information is 0.2 m/s, the target time threshold is 10 s.

In this implementation, threshold setting should be associated with the movement speed of the to-be-located device, without simply setting a same threshold. If the movement status of the to-be-located device is a low-speed state such as still or walking, a residual AP has less influence on positioning accuracy. On the contrary, if more residual APs are reserved, a larger quantity of MAC addresses are used for positioning calculation, improving positioning accuracy. Therefore, in this case, a threshold may be relaxed. If the movement status of the to-be-located device is a high-speed movement state such as driving, a distance at which a to-be-located object moves within a same time is longer, and a residual AP has a relatively large influence on positioning accuracy, and therefore a threshold should be reduced.

Figure 4:
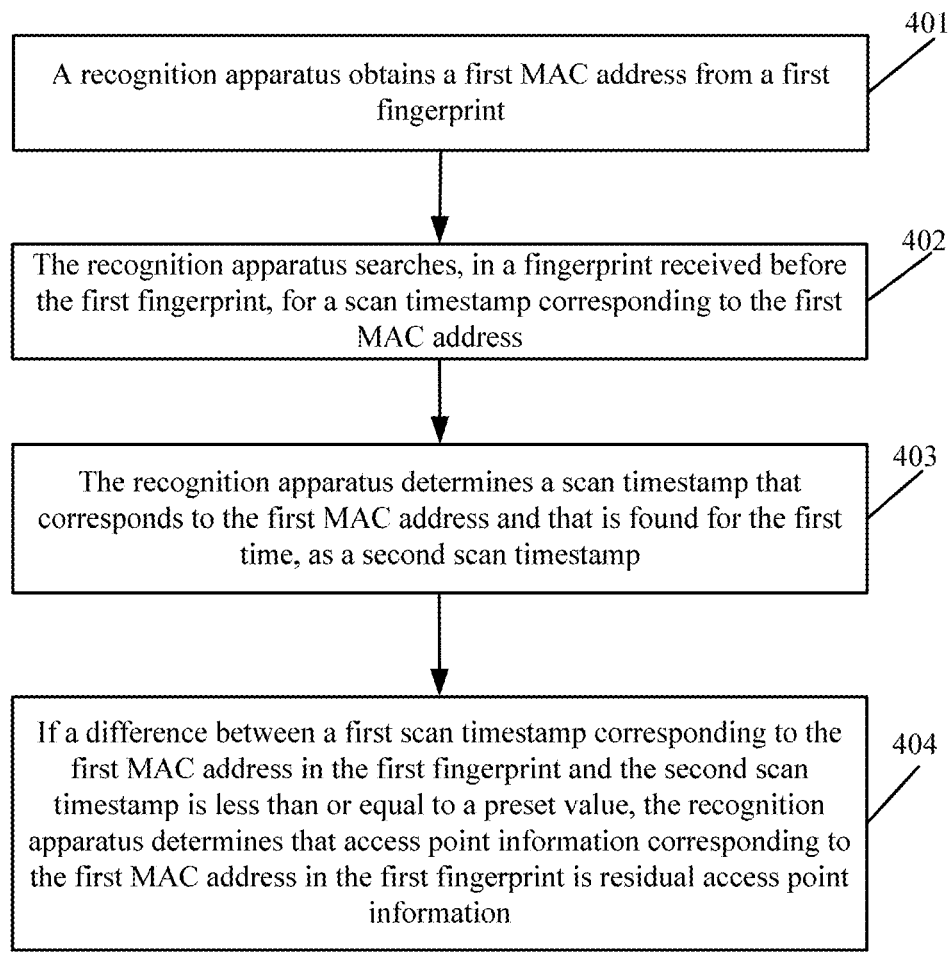
FIG. 4 is a schematic flowchart of another residual access point information recognition method according to an embodiment of the present invention.

FIG. 4 shows a residual access point information recognition method according to an embodiment of this application. As shown in FIG. 4, the residual access point information recognition method includes the following sections 401 to 404.

401. A recognition apparatus obtains a first MAC address from a first fingerprint.

The recognition apparatus may be a server or a to-be-located device.

In this embodiment of this application, if the recognition apparatus is a to-be-located device, the first fingerprint may be a fingerprint currently discovered by scanning. When the recognition apparatus is a server, the first fingerprint may be a currently received fingerprint, or in other words, each time the server receives a fingerprint, the server can recognize residual access point information included in the received fingerprint. This implementation may be applied to a scenario in which the recognition apparatus needs to perform real-time positioning. This implementation is applicable to an online positioning phase. The first fingerprint is a fingerprint, including access point information, sent to the recognition apparatus by the to-be-located device, and the recognition apparatus performs positioning on the to-be-located device based on the first fingerprint and a fingerprint in a location database. Due to a need of timely positioning, the recognition apparatus needs to recognize residual access point information included in a fingerprint when receiving the fingerprint. Certainly, this implementation is also applicable to an offline training phase. Each time the recognition apparatus receives a fingerprint, the recognition apparatus recognizes residual access point information included in the received fingerprint, and stores non-residual access point information in the location database.

Optionally, if the recognition apparatus is a server, the recognition apparatus may recognize residual access point information after receiving a plurality of fingerprints. The first fingerprint may be one of the plurality of fingerprints that have been received, and is not an earliest received fingerprint of the plurality of fingerprints. For example, after receiving 100 fingerprints, the recognition apparatus recognizes residual access point information included in the 99 fingerprints. The first fingerprint may be the last received 100$^{th}$ fingerprint, the 99$^{th}$ fingerprint, the 98$^{th}$ fingerprint, the 2$^{nd}$ fingerprint, or the like. This implementation is applicable to the offline training phase. In the offline training phase, the plurality of fingerprints received in the offline training phase are not required for positioning. Therefore, residual access point information recognition may be performed on the plurality of fingerprints after the plurality of fingerprints are received, and then non-residual access point information is stored in the location database.

The first fingerprint includes one or more pieces of access point information. Each piece of access point information includes a MAC address and a scan timestamp. The first MAC address may be any MAC address in the first fingerprint.

For example, the first fingerprint includes access point information 1 to 3, the access point information 1 includes a MAC address 1 and a scan timestamp 1, the access point information 2 includes a MAC address 2 and a scan timestamp 2, and the access point information 3 includes a MAC address 3 and a scan timestamp 3. The first MAC address may be the MAC address 1, the MAC address 2, or the MAC address 3. A scan timestamp corresponding to the MAC address 1 is the scan timestamp 1, and access point information corresponding to the MAC address 1 is the access point information 1. The same is true for the MAC address 2 and the MAC address 3.

402. The recognition apparatus searches a fingerprint received before the first fingerprint for a scan timestamp corresponding to the first MAC address.

Optionally, the recognition apparatus may search, in a reverse order of reception of fingerprints the fingerprint received before the first fingerprint, for the scan timestamp corresponding to the first MAC address.

403. The recognition apparatus determines a scan timestamp that corresponds to the first MAC address and that is found for the first time, as a second scan timestamp.

404. If a difference between a first scan timestamp corresponding to the first MAC address in the first fingerprint and the second scan timestamp is less than or equal to a preset value, the recognition apparatus determines that access point information corresponding to the first MAC address in the first fingerprint is residual access point information.

The preset value is greater than or equal to zero. If the preset value is equal to zero, the difference between the first scan timestamp corresponding to the first MAC address in the first fingerprint and the second scan timestamp is equal to the preset value, and the recognition apparatus determines that the access point information corresponding to the first MAC address in the first fingerprint is residual access point information. If the preset value is greater than zero, the difference between the first scan timestamp corresponding to the first MAC address in the first fingerprint and the second scan timestamp is less than or equal to the preset value, and the recognition apparatus determines that the access point information corresponding to the first MAC address in the first fingerprint is residual access point information.

Optionally, if no scan timestamp corresponding to the first MAC address is found in the fingerprint received before the first fingerprint, it is determined that the access point information corresponding to the first MAC address in the first fingerprint is non-residual access point information.

This embodiment of this application is further described below by using a complete example:

For example, the recognition apparatus receives fingerprints 1 to 4 in sequence, and the fingerprints 1 to 4 each include three pieces of access point information. The access point information included in the fingerprints 1 to 4 is listed in the following Table 1. As listed in the following Table 1, access point information 1 in the fingerprint 4 includes a MAC address 90:c1:bb:e2:d3:d2 and a scan timestamp 143800155, and access point information 2 includes a MAC address 70:fe:a0:b1:f3:d4 and a scan timestamp 143811580, and access point information 3 includes a MAC address 70:fe:a0:b1:f3:c2 and a scan timestamp 143812000.

For example, if the fingerprint 4 is the first fingerprint, the recognition apparatus selects, from the fingerprint 4, 90:c1:bb:e2:d3:d2 included in the access point information 1 as the first MAC address. The recognition apparatus searches, in a reverse order of reception of the fingerprints 1 to 3 the fingerprints 1 to 3, for a scan timestamp corresponding to the first MAC address. The recognition apparatus first searches the fingerprint 3 for the scan timestamp corresponding to the first MAC address; if no scan timestamp corresponding to the first MAC address is found in the fingerprint 3, the recognition apparatus searches the fingerprint 2 for the scan timestamp corresponding to the first MAC address; and if no scan timestamp corresponding to the first MAC address is found in the fingerprint 2, the recognition apparatus searches the fingerprint 1 for the scan timestamp corresponding to the first MAC address. If the recognition apparatus finds the scan timestamp corresponding to the first MAC address, the recognition apparatus stops the search. In this example, the recognition apparatus finds, in the fingerprint 3 for the first time, a second scan timestamp corresponding to the first MAC address, that is, 143800155. The recognition apparatus calculates a difference between the first scan timestamp and the second scan timestamp. The first scan timestamp is 143800155, corresponding to 90:c1:bb:e2:d3:d2, in the fingerprint 4. Therefore, the difference between the first scan timestamp and the second scan timestamp is zero. A preset value is a value greater than or equal to zero. If the preset value is a value greater than zero, the difference between the first scan timestamp and the second scan timestamp is less than the preset value, and the recognition apparatus determines that the access point information 1 in the fingerprint 4 is residual access point information. If the preset value is equal to zero, the difference between the first scan timestamp and the second scan timestamp is equal to the preset value, and the recognition apparatus determines that the access point information 1 in the fingerprint 4 is residual access point information. Similarly, the recognition apparatus can further recognize, in this manner, whether access point information 2 and access point information 3 are residual access point information. In the fingerprints 3 to 1, there is no scan timestamp corresponding to 70:fe:a0:b1:f3:d4, and therefore the access point information 2 is non-residual access point information. A scan timestamp that corresponds to 70:fe:a0:b1:f3:c2 and that is found by the recognition apparatus in the fingerprint 2 for the first time is 143786400, and a difference between 143812000 and 143786400 is greater than the preset value (for example, 1000 ms). Therefore, the access point information 3 is non-residual access point information.

Similarly, the recognition apparatus can further recognize, according to this principle, whether access point information in the fingerprint 3, the fingerprint 2, or the fingerprint 1 is residual access point information.

TABLE 1

| Fingerprint | Access point information 1 | | Access point information 2 | | Access point information 3 | |
|---|---|---|---|---|---|---|
| | MAC address | Scan timestamp | MAC address | Scan timestamp | MAC address | Scan timestamp |
| Fingerprint 1 | 70:fe:a0:b1:f3:c2 | 143786400 | 90:c1:bb:e2:c1:d0 | 143786400 | 90:c1:bb:e2:c1:d2 | 143788400 |
| Fingerprint 2 | 90:c1:bb:e2:c1:d0 | 143794210 | 70:fe:a0:b1:f3:c2 | 143786400 | 90:c1:bb:e2:d3:d2 | 143794210 |
| Fingerprint 3 | 90:c1:bb:e2:d3:d2 | 143800155 | 90:c1:bb:e2:c1:d0 | 143794210 | 90:c1:bb:e2:c1:d2 | 143800255 |
| Fingerprint 4 | 90:c1:bb:e2:d3:d2 | 143800155 | 90:c1:bb:e2:c1:d0 | 143811580 | 70:fe:a0:b1:f3:c2 | 143812000 |

It is found in practice that for a same MAC address, two independent scans are unique in terms of time dimension, or in other words, for two scans corresponding to a same MAC address, scan timestamps are definitely different. On the contrary, if it is discovered that a MAC address corresponds to a same scan timestamp during two scans, residual access point information is definitely included in information discovered by the two scans and is usually in information discovered by a later one in the two scans. Therefore, residual access point information included in a fingerprint can be accurately recognized by implementing the method described in FIG. 3.

Optionally, a specific implementation of the searching, by the recognition apparatus, a fingerprint received before the first fingerprint for a scan timestamp corresponding to the first MAC address may be: searching, by the recognition apparatus in a reverse order of reception of fingerprint information, N fingerprints received before the first fingerprint for the scan timestamp corresponding to the first MAC address, where N is greater than 0, and the N fingerprints are stored in a first-in first-out queue. Optionally, N is greater than or equal to 3. A larger N indicates that recognized residual access point information is more accurate.

Figure 5:
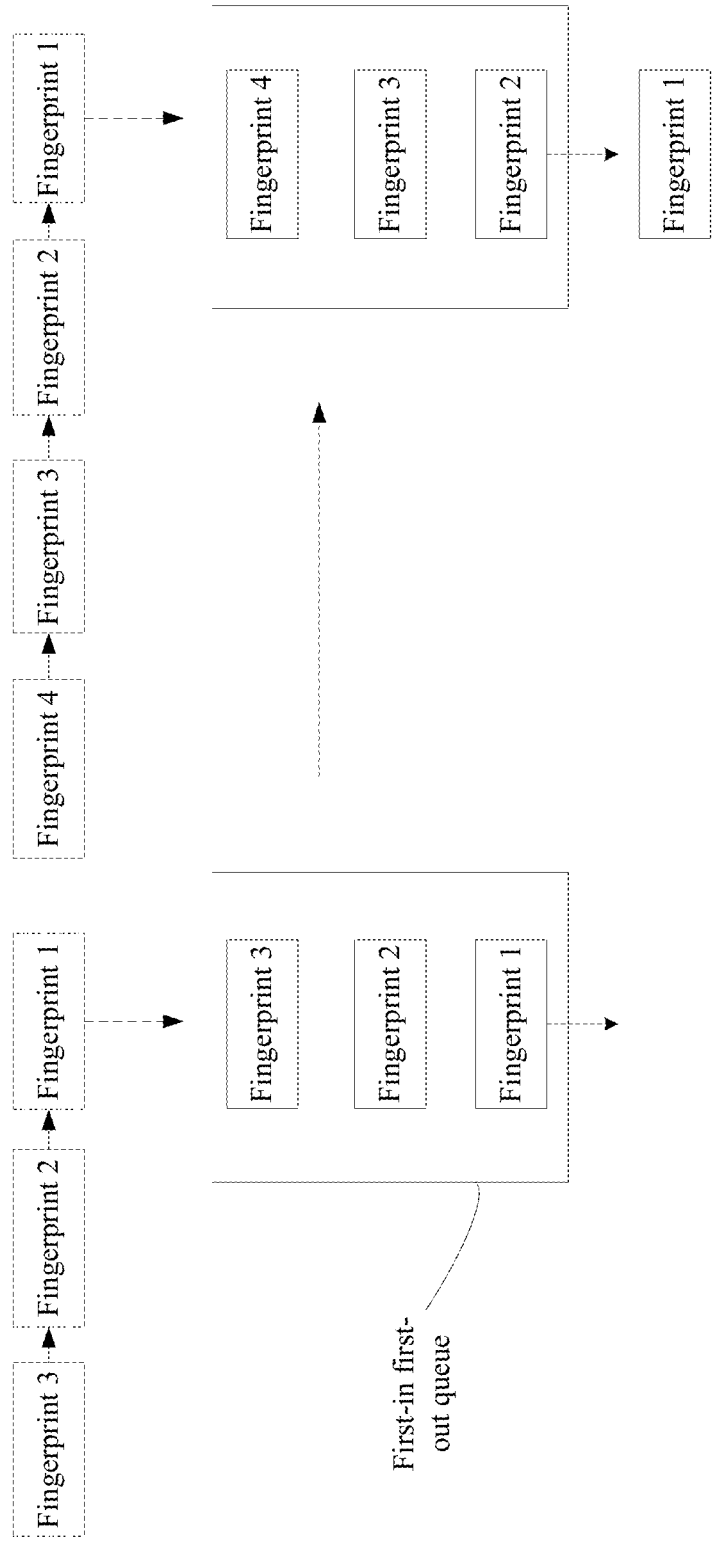
FIG. 5 is a schematic diagram of a first-in first-out queue according to an embodiment of the present invention.

For example, as shown in FIG. 5, three fingerprints are stored in a first-in first-out queue in sequence, and are a fingerprint 1, a fingerprint 2, and a fingerprint 3. Access point information included in fingerprints 1 to 4 may be listed in Table 1. When receiving the fingerprint 4, the recognition apparatus obtains a MAC address in access point information 1 in the fingerprint 4 as a first MAC address, and then searches, in a reverse order of reception of the fingerprints the fingerprints stored in the first-in first-out queue, for a scan timestamp corresponding to the first MAC address in the fingerprint 4. To be specific, the recognition apparatus first searches the fingerprint 3 for the scan timestamp corresponding to the first MAC address; if no scan timestamp corresponding to the first MAC address is found in the fingerprint 3, the recognition apparatus searches the fingerprint 2 for the scan timestamp corresponding to the first MAC address; and if no scan timestamp corresponding to the first MAC address is found in the fingerprint 2, the recognition apparatus searches the fingerprint 1 for the scan timestamp corresponding to the first MAC address. The recognition apparatus receives the first MAC address in the fingerprint 3 for the first time, that is, 90:c1:bb:e2:d3:d2. The recognition apparatus obtains a scan timestamp, corresponding to 90:c1:bb:e2:d3:d2, in the fingerprint 3 as a second scan timestamp, that is, 143800155. The recognition apparatus calculates a difference between the first scan timestamp and the second scan timestamp. The first scan timestamp is 143800155, corresponding to 90:c1:bb:e2:d3:d2, in the fingerprint 4. Therefore, the difference between the first scan timestamp and the second scan timestamp is zero. The difference between the first scan timestamp and the second scan timestamp is less than a preset value. Therefore, the recognition apparatus determines that the access point information 1 in the fingerprint 4 is residual access point information. The recognition apparatus can further recognize, according to a same principle, whether the access point information 2 and the access point information 3 in the fingerprint 4 are residual access point information. As shown in FIG. 5, after recognizing whether all access point information in the fingerprint 4 is residual access point information, the recognition apparatus deletes the fingerprint 1 from the queue, and stores the fingerprint 4 in the first-in first-out queue. After receiving a fingerprint 5, the recognition apparatus recognizes, based on the fingerprints stored in the first-in first-out queue, whether access point information in the fingerprint 5 is residual access point information.

This implementation may be applied to a scenario in which each time a fingerprint is received, residual access point information included in the received fingerprint is recognized. In this implementation, the recognition apparatus can store, in the first-in first-out queue, a fingerprint received before the first fingerprint. This helps the recognition apparatus to search, in a reverse order of reception of fingerprints the fingerprint received before the first fingerprint, for the scan timestamp corresponding to the first MAC address.

Optionally, if no scan timestamp corresponding to the first MAC address is found in N fingerprints received before the first fingerprint, it is determined that the access point information corresponding to the first MAC address in the first fingerprint is non-residual access point information.

Optionally, after determining that the access point information corresponding to the first MAC address in the first fingerprint is residual access point information, the recognition apparatus does not immediately delete the residual access point information, but may mark the residual access point information. For example, the recognition apparatus marks the residual access point information as 1. When the first fingerprint is deleted from the first-in first-out queue, the residual access point information included in the first fingerprint is deleted. If the residual access point information in the first fingerprint is deleted from the first-in first-out queue, residual access point information in a fingerprint received after the first fingerprint may not be accurately recognized. Therefore, the residual access point information included in the first fingerprint is deleted only when the first fingerprint is deleted from the first-in first-out queue. This is conducive to improvement of accuracy of recognizing residual access point information in a subsequent fingerprint.

Figure 6:
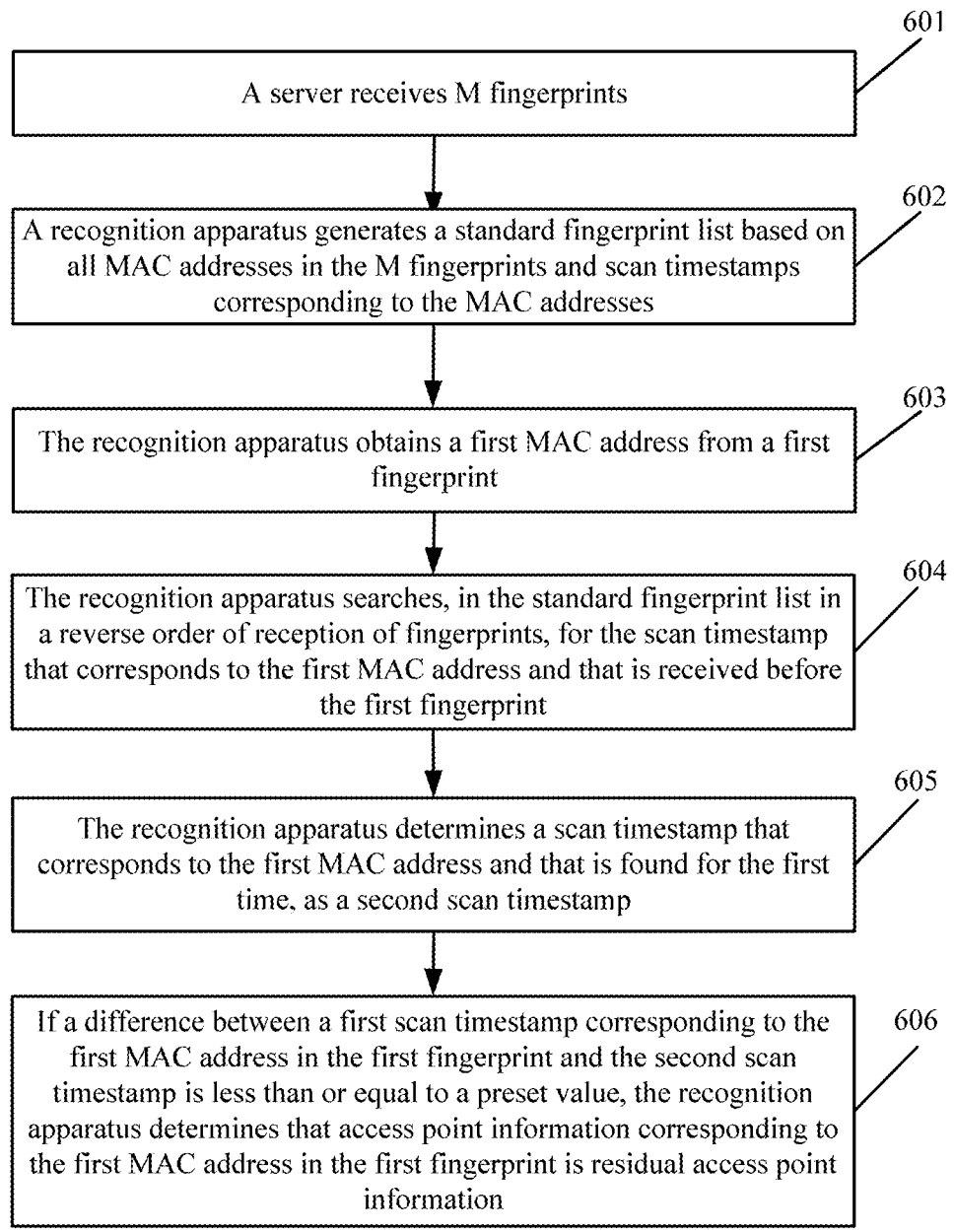
FIG. 6 is a schematic flowchart of another residual access point information recognition method according to an embodiment of the present invention.

Optionally, as shown in FIG. 6, the recognition apparatus may receive M fingerprints. The first fingerprint is one of the M fingerprints and is not an earliest received fingerprint among the M fingerprints, and M is greater than 1. The recognition apparatus generates a standard fingerprint list based on all MAC addresses in the M fingerprints and scan timestamps corresponding to the MAC addresses, where in the standard fingerprint list, one row corresponds to one fingerprint, and one column includes a scan timestamp corresponding to one MAC address.

As shown in FIG. 6, a specific implementation of the searching, by the recognition apparatus, a fingerprint received before the first fingerprint for a scan timestamp corresponding to the first MAC address may be: searching, by the recognition apparatus in a reverse order of reception of fingerprints, the standard fingerprint list for the scan timestamp that corresponds to the first MAC address and that is received before the first fingerprint.

In other words, in this implementation, after receiving the M fingerprints, the recognition apparatus performs residual access point information recognition on each of the M fingerprints.

During actual application, M may be several hundred or several thousand. For convenience of example description, the following provides description by using an example in which M is 4. The recognition apparatus receives fingerprints 1 to 4 in sequence. Access point information included in the fingerprints 1 to 4 may be listed in the foregoing Table 1. After receiving the fingerprints 1 to 4, the recognition apparatus generates a standard fingerprint list based on the access point information in the fingerprints 1 to 4, that is, all MAC addresses in the fingerprints 1 to 4 and scan timestamps corresponding to the MAC addresses. The generated standard fingerprint list may be shown in the following Table 2. As shown in the following Table 2, the standard fingerprint list includes the scan timestamps corresponding to all the MAC addresses in the fingerprints 1 to 4. Each column includes a scan timestamp corresponding to one MAC address, and one row corresponds to one fingerprint. Optionally, that a fingerprint does not include a scan timestamp corresponding to a MAC address is marked as 0.

For example, if the fingerprint 4 is the first fingerprint, the recognition apparatus selects, from the fingerprint 4, 90:c1:bb:e2:d3:d2 included in access point information 1 as the first MAC address. In the standard fingerprint list shown in the foregoing Table 2, the recognition apparatus searches, in a reverse order of reception of the fingerprints 1 to 3, for a scan timestamp corresponding to the first MAC address. The recognition apparatus finds, in the fingerprint 3 for the first time, a second scan timestamp corresponding to the first MAC address, that is, 143800155. The recognition apparatus calculates a difference between the first scan timestamp and the second scan timestamp. The first scan timestamp is 143800155, corresponding to 90:c1:bb:e2:d3:d2, in the fingerprint 4. Therefore, the difference between the first scan timestamp and the second scan timestamp is zero. A preset value is a value greater than or equal to zero. If the preset value is a value greater than zero, the difference between the first scan timestamp and the second scan timestamp is less than the preset value, and the recognition apparatus determines that the access point information 1 in the fingerprint 4 is residual access point information. If the preset value is equal to zero, the difference between the first scan timestamp and the second scan timestamp is equal to the preset value, and the recognition apparatus determines that the access point information 1 in the fingerprint 4 is residual access point information. Similarly, the recognition apparatus can further recognize, in this manner, whether access point information 2 and access point information 3 are residual access point information. In the fingerprints 3 to 1, there is no scan timestamp corresponding to 70:fe:a0:b1:f3:d4, and therefore the access point information 2 is non-residual access point information. A scan timestamp that corresponds to 70:fe:a0:b1:f3:c2 and that is found by the recognition apparatus in the fingerprint 2 for the first time is 143786400, and a difference between 143812000 and 143786400 is greater than the preset value (for example, 1000 ms). Therefore, the access point information 3 is non-residual access point information.

Similarly, if the fingerprint 3 or the fingerprint 2 is the first fingerprint, non-residual access point information recognition may be performed on the fingerprint 3 or the fingerprint 2 according to the foregoing principle.

This implementation may be applied to a scenario in which the recognition apparatus does not need to perform real-time positioning. This implementation is applicable to an offline training phase. In the offline training phase, the

TABLE 2

| MAC Address | 70:fe:a0:b1:f3:c2 | 90:c1:bb:e2:c1:d0 | 90:c1:bb:e2:c1:d2 | 90:c1:bb:e2:d3:d2 | 70:fe:a0:b1:f3:d4 |
| --- | --- | --- | --- | --- | --- |
| Fingerprint 1 | 143786400 | 143786400 | 143788400 | 0 | 0 |
| Fingerprint 2 | 143786400 | 143794210 | 0 | 143794210 | 0 |
| Fingerprint 3 | 0 | 143794210 | 143800255 | 143800155 | 0 |
| Fingerprint 4 | 143812000 | 0 | 0 | 143800155 | 143811580 |

The recognition apparatus may first select a last received fingerprint as the first fingerprint. After residual access point information recognition on the first fingerprint is completed, residual access point information recognition on the fingerprint 3 and the fingerprint 2 are performed in sequence. Alternatively, the recognition apparatus may first select the fingerprint 2 as the first fingerprint. After residual access point information recognition on the first fingerprint is completed, residual access point information recognition on the fingerprint 3 and the fingerprint 4 are performed in sequence.

plurality of fingerprints received in the offline training phase are not required for positioning. Therefore, after the plurality of fingerprints are received, a standard fingerprint list is generated based on the plurality of fingerprints, and residual access point information recognition is performed on the fingerprints based on the standard fingerprint list. Then non-residual access point information is stored in a location database. By generating the standard fingerprint list, the second scan timestamp corresponding to the first MAC address can be searched for more conveniently and faster.

Optionally, if no scan timestamp corresponding to the first MAC address is found in N fingerprints received before the first fingerprint, it is determined that the access point information corresponding to the first MAC address in the first fingerprint is non-residual access point information.

In this embodiment of this application, function unit division may be performed on the apparatus based on the examples of the method. For example, function units may be obtained through division based on corresponding functions, or at least two functions may be integrated into one unit. The integrated unit may be implemented in a form of hardware, or may be implemented in a form of a software functional unit. It should be noted that, in this embodiment of the present invention, unit division is an example, and is merely logical function division. In actual implementation, another division manner may be used.

Figure 7:
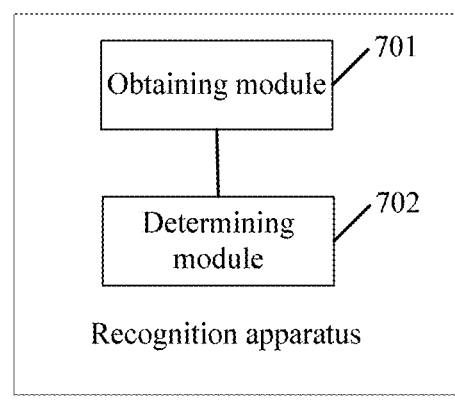
FIG. 7 is a schematic structural diagram of a recognition apparatus according to an embodiment of the present invention.

FIG. 7 shows another recognition apparatus according to an embodiment of the present invention. The recognition apparatus includes an obtaining module 701 and a determining module 702.

The obtaining module 701 is configured to obtain first movement information of a to-be-located device, where the first movement information is a movement status or a movement speed of the to-be-located device.

The obtaining module 701 is further configured to obtain a target time threshold based on the first movement information.

The obtaining module 701 is further configured to obtain a first scan timestamp corresponding to a target time and a first media access control MAC address, where the target time is a fingerprint collection time of a first fingerprint or a maximum value of a scan timestamp corresponding to at least one MAC address included in the first fingerprint, and the first MAC address is a MAC address in the first fingerprint.

The determining module 702 is configured to: if a difference between the target time and the first scan timestamp is greater than the target time threshold, determine that access point information corresponding to the first MAC address is residual access point information.

Optionally, the first movement information is a movement status, and the obtaining module 701 is specifically configured to:

obtain, based on a preset correspondence between a movement status and a threshold, a threshold corresponding to the first movement information as the target time threshold, where in the correspondence, a first movement status corresponds to a first threshold, and a second movement status corresponds to a second threshold; a movement speed corresponding to the first movement status is lower than a movement speed corresponding to the second movement status; and the first threshold is greater than or equal to the second threshold.

Optionally, the first movement information is a movement speed, and the obtaining module 701 is specifically configured to:

obtain, based on a preset correspondence between a speed interval and a threshold, a threshold corresponding to a speed interval corresponding to the first movement information as the target time threshold, where in the correspondence, a first speed interval corresponds to a first threshold, and a second speed interval corresponds to a second threshold; all speeds in the first speed interval are lower than speeds in the second speed interval; and the first threshold is greater than or equal to the second threshold.

The apparatus further includes:

a deletion module, configured to: after the determining module determines that the access point information corresponding to the first MAC address is residual access point information, delete, from the first fingerprint, the access point information corresponding to the first MAC address.

Figure 8:
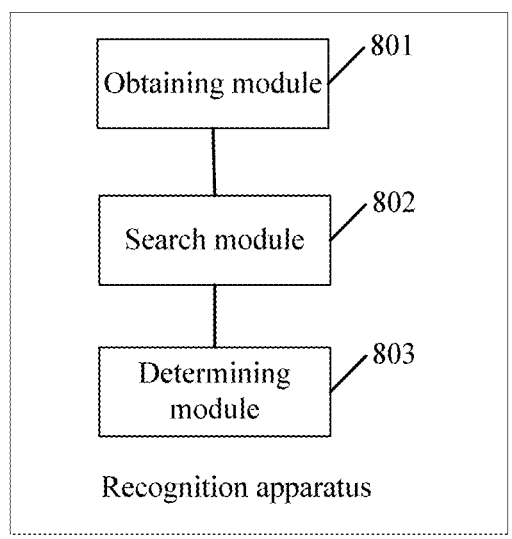
FIG. 8 is a schematic structural diagram of another recognition apparatus according to an embodiment of the present invention.

FIG. 8 shows a recognition apparatus according to an embodiment of the present invention. The recognition apparatus includes: an obtaining module 801, a search module 802, and a determining module 803.

The obtaining module 801 is configured to obtain a first media access control MAC address from a first fingerprint; the search module 802 is configured to search a fingerprint received before the first fingerprint for a scan timestamp corresponding to the first MAC address; the determining module 803 is configured to determine a scan timestamp that corresponds to the first MAC address and that is found for the first time, as a second scan timestamp; and the determining module 803 is further configured to: if a difference between a first scan timestamp corresponding to the first MAC address in the first fingerprint and the second scan timestamp is less than or equal to a preset value, determine that access point information corresponding to the first MAC address in the first fingerprint is residual access point information.

Optionally, the search module 802 is specifically configured to: search, in a reverse order of reception of fingerprint information N fingerprints received before the first fingerprint, for the scan timestamp corresponding to the first MAC address, where N is greater than 0, and the N fingerprints are stored in a first-in first-out queue.

Optionally, the recognition apparatus further includes a deletion module, configured to: when the first fingerprint is deleted from the first-in first-out queue, delete the residual access point information included in the first fingerprint.

Optionally, the recognition apparatus further includes: a receiving module, configured to receive M fingerprints, where the first fingerprint is one of the M fingerprints and is not an earliest received fingerprint among the M fingerprints, and M is greater than 1; a generation module, configured to generate a standard fingerprint list based on all MAC addresses in the M fingerprints and scan timestamps corresponding to the MAC addresses, where in the standard fingerprint list, one row corresponds to one fingerprint, and one column includes a scan timestamp corresponding to one MAC address; and the search module 802 is specifically configured to: search, in a reverse order of reception of fingerprints the standard fingerprint list, for the scan timestamp that corresponds to the first MAC address and that is received before the first fingerprint.

Optionally, the determining module 803 is further configured to: if no scan timestamp corresponding to the first MAC address is found in the fingerprint received before the first fingerprint, determine that the access point information corresponding to the first MAC address in the first fingerprint is non-residual access point information.

Figure 9:
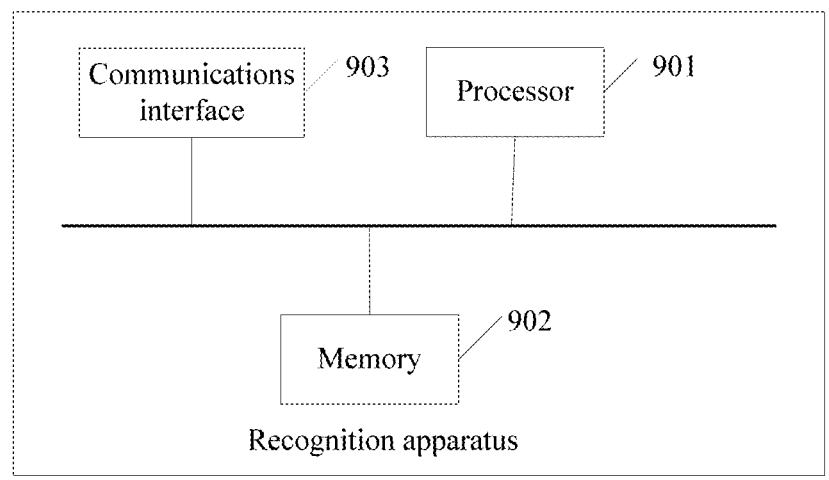
FIG. 9 is a schematic structural diagram of still another recognition apparatus according to an embodiment of the present invention.

FIG. 9 is a schematic structural diagram of a recognition apparatus disclosed in an embodiment of this application. As shown in FIG. 9, the recognition apparatus 900 includes a processor 901, a memory 902, and a communications interface 903, where the processor 901, the memory 902, and the communications interface 903 are connected.

The processor 901 may be a central processing unit (central processing unit, CPU), a general-purpose processor, a coprocessor, a digital signal processor (digital signal processor, DSP), an application-specific integrated circuit (application-specific integrated circuit, ASIC), a field programmable gate array (field programmable gate array, FPGA), or another programmable logic device, a transistor logic device, a hardware component, or any combination thereof. Alternatively, the processor 901 may be a combination of processors implementing a computing function, for example, a combination of one or more microprocessors, or a combination of the DSP and a microprocessor.

The communications interface 903 is configured to implement communication with another network element (such as a terminal device).

The processor 901 calls program code stored in the memory 902 to perform steps performed by the recognition apparatus described in FIG. 3, FIG. 4 and FIG. 6 in the foregoing method embodiments, or perform other steps performed by the recognition apparatus in the method embodiments.

Based on a same inventive concept, problem-solving principles of devices provided in the embodiments of this application are similar to those of the method embodiments of this application. Therefore, for implementations of the devices, refer to implementations of the methods. For conciseness of description, details are not described herein again.

In the foregoing embodiments, the descriptions of the embodiments have respective focuses. For a part that is not described in detail in an embodiment, refer to related descriptions in other embodiments.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A residual access point information recognition method, the method comprising:
   obtaining first movement information of a to-be-located device;
   obtaining a target time threshold based on the first movement information;
   obtaining a first scan timestamp corresponding to a target time and a first media access control (MAC) address, wherein the target time is a fingerprint collection time of a first fingerprint or a maximum value of a scan timestamp corresponding to at least one MAC address included in the first fingerprint, and the first MAC address is included in the first fingerprint;
   if a difference between the target time and the first scan timestamp is greater than the target time threshold, determining that access point information corresponding to the first MAC address is residual access point information; and
   deleting the access point information corresponding to the first MAC address from the first fingerprint after determining that the access point information corresponding to the first MAC address is residual access point information.

2. The method according to claim 1, method further comprising:
   detecting a movement speed of the to-be-located device, wherein
   the first movement information is a movement status,
   the movement status is one of at least two different movement statuses comprising a first movement status and a second movement status,
   the target time threshold is one of at least two different target time thresholds comprising a first target time threshold corresponding to the first movement status and a second target time threshold corresponding to the second movement status,
   the first target time threshold is greater than or equal to the second target time threshold,
   a first movement speed range is indicative of the first movement status,
   a second movement speed range is indicative of the second movement status,
   the first movement speed range includes values less than the second movement speed range, and
   obtaining the target time threshold based on the first movement information comprises:
      determining the movement status is the first movement status or the second movement status based the movement speed; and
      obtaining the first target time threshold or the second target time threshold to be used as the target time threshold based on the determination of whether the movement status is the first movement status or the second movement status.

3. The method according to claim 1, method further comprising:
   detecting a movement speed of the to-be-located device, wherein
   the first movement information is the movement speed,
   the target time threshold is one of at least two different target time thresholds comprising a first target time threshold corresponding to a first speed interval and a second target time threshold corresponding to a second speed interval,
   the first target time threshold is greater than or equal to the second target time threshold,
   the first speed interval includes values less than the second speed interval, and
   obtaining a target time threshold based on the first movement information comprises:
      obtaining the first target time threshold or the second target time threshold to be used as the target time threshold based on a determination of whether the movement speed is the first speed interval or the second speed interval.

4. A recognition apparatus, comprising:
   a display;
   one or more processors; and
   a memory having computer readable instructions stored thereon that, when executed by at least one of the one or more processors, causes the recognition apparatus to:
   obtain first movement information of a to-be-located device;
   obtain a target time threshold based on the first movement information;
   obtain a first scan timestamp corresponding to a target time and a first media access control (MAC) address, wherein the target time is a fingerprint collection time of a first fingerprint or a maximum value of a scan timestamp corresponding to at least one MAC address included in the first fingerprint, and the first MAC address is included in the first fingerprint;
if a difference between the target time and the first scan timestamp is greater than the target time threshold, determining that access point information corresponding to the first MAC address is residual access point information; and
delete the access point information corresponding to the first MAC address from the first fingerprint after determining that the access point information corresponding to the first MAC address is residual access point information.

5. The recognition apparatus according to claim 4, wherein the recognition apparatus is further caused to:
detect a movement speed of the to-be-located device,
wherein
the first movement information is a movement status,
the movement status is one of at least two different movement statuses comprising a first movement status and a second movement status,
the target time threshold is one of at least two different target time thresholds comprising a first target time threshold corresponding to the first movement status and a second target time threshold corresponding to the second movement status,
the first target time threshold is greater than or equal to the second target time threshold,
a first movement speed range is indicative of the first movement status,
a second movement speed range is indicative of the second movement status,
the first movement speed range includes values less than the second movement speed range, and
obtaining the target time threshold based on the first movement information comprises:
determining the movement status is the first movement status or the second movement status based the movement speed; and
obtaining the first target time threshold or the second target time threshold to be used as the target time threshold based on the determination of whether the movement status is the first movement status or the second movement status.

6. The recognition apparatus according to claim 4, wherein the recognition apparatus is further caused to:
detect a movement speed of the to-be-located device,
wherein
the first movement information is the movement speed,
the target time threshold is one of at least two different target time thresholds comprising a first target time threshold corresponding to a first speed interval and a second target time threshold corresponding to a second speed interval,
the first target time threshold is greater than or equal to the second target time threshold,
the first speed interval includes values less than the second speed interval, and
obtaining a target time threshold based on the first movement information comprises:
obtaining the first target time threshold or the second target time threshold to be used as the target time threshold based on a determination of whether the movement speed is the first speed interval or the second speed interval.

7. A recognition apparatus, comprising:
a display;
one or more processors; and
a memory having computer readable instructions stored thereon that, when executed by at least one of the one or more processors, causes the recognition apparatus to:
obtain a first media access control (MAC) address from a first fingerprint;
search a second fingerprint received before the first fingerprint for a first scan timestamp corresponding to the first MAC address;
determine a second scan timestamp that corresponds to the first MAC address and that is found for the first time;
if a difference between the first scan timestamp and the second scan timestamp is less than or equal to a preset value, determining that access point information corresponding to the first MAC address in the first fingerprint is residual access point information; and
delete the residual access point information in the first fingerprint after determining that the access point information corresponding to the first MAC address in the first fingerprint is residual access point information.

8. The recognition apparatus according to claim 7, wherein searching the second fingerprint received before the first fingerprint for the first scan timestamp comprises:
searching, in a reverse order of reception of fingerprint information comprising N fingerprints received before the first fingerprint, for the first scan timestamp corresponding to the first MAC address, wherein N is greater than 0, and the N fingerprints are stored in a first-in first-out queue.

9. The recognition apparatus according to claim 7, wherein the recognition apparatus is further caused to:
receive M fingerprints, wherein the first fingerprint is one of the M fingerprints and is not an earliest received fingerprint among the M fingerprints, and M is greater than 1; and
generate a standard fingerprint list based on all MAC addresses in the M fingerprints and scan timestamps corresponding to the MAC addresses, wherein in the standard fingerprint list, one row corresponds to one fingerprint, and one column comprises a scan timestamp corresponding to one MAC address; and
the searching the second fingerprint received before the first fingerprint for the first scan timestamp corresponding to the first MAC address comprises:
searching, in a reverse order of reception of fingerprints in the standard fingerprint list, for the first scan timestamp that corresponds to the first MAC address and that is received before the first fingerprint.

10. The recognition apparatus according to claim 7, wherein the recognition apparatus is further caused to:
if no scan timestamp corresponding to the first MAC address is found in the second fingerprint received before the first fingerprint, determine that the access point information corresponding to the first MAC address in the first fingerprint is non-residual access point information.

* * * * *